United States Patent
Liu et al.

(10) Patent No.: US 12,534,619 B2
(45) Date of Patent: Jan. 27, 2026

(54) CURABLE COMPOSITION AND METHOD OF FORMING CURED PRODUCT

(71) Applicant: DOW SILICONES CORPORATION, Midland, MI (US)

(72) Inventors: Junying Liu, Midland, MI (US); Bizhong Zhu, Midland, MI (US); Nick Evan Shephard, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 19/100,020

(22) PCT Filed: Jul. 26, 2023

(86) PCT No.: PCT/US2023/028652
§ 371 (c)(1),
(2) Date: Jan. 30, 2025

(87) PCT Pub. No.: WO2024/030296
PCT Pub. Date: Feb. 8, 2024

(65) Prior Publication Data
US 2025/0257217 A1    Aug. 14, 2025

Related U.S. Application Data

(60) Provisional application No. 63/393,964, filed on Jul. 31, 2022.

(51) Int. Cl.
| | | |
|---|---|---|
| *C08L 83/08* | (2006.01) | |
| *C08F 2/50* | (2006.01) | |
| *C08K 5/5415* | (2006.01) | |
| *C08K 5/5425* | (2006.01) | |
| *C09D 183/08* | (2006.01) | |
| *C08G 77/20* | (2006.01) | |
| *C08G 77/28* | (2006.01) | |

(52) U.S. Cl.
CPC ............... *C08L 83/08* (2013.01); *C08F 2/50* (2013.01); *C08K 5/5415* (2013.01); *C08K 5/5425* (2013.01); *C09D 183/08* (2013.01); *C08G 77/20* (2013.01); *C08G 77/28* (2013.01); *C08L 2205/025* (2013.01); *C08L 2205/03* (2013.01)

(58) Field of Classification Search
CPC .................................................. C08K 5/5425
See application file for complete search history.

(56) References Cited

U.S. PATENT DOCUMENTS

| | | | |
|---|---|---|---|
| 4,780,486 A | 10/1988 | Lee et al. | |
| 4,889,905 A * | 12/1989 | Suzuki | .................... C08L 83/04 528/33 |
| 4,921,880 A | 5/1990 | Lee et al. | |
| 4,975,472 A | 12/1990 | Motegi et al. | |
| 5,013,807 A | 5/1991 | Shimizu et al. | |
| 5,093,454 A | 3/1992 | Fujimoto et al. | |
| 5,158,988 A * | 10/1992 | Kurita | ...................... C08K 5/53 528/30 |
| 8,716,362 B2 | 5/2014 | Ono et al. | |
| 9,340,711 B2 | 5/2016 | Ono et al. | |

FOREIGN PATENT DOCUMENTS

| | | |
|---|---|---|
| JP | H0245561 A | 2/1990 |
| JP | H02151660 A | 6/1990 |
| WO | 2020076620 A1 | 4/2020 |
| WO | 2022051207 A1 | 3/2022 |

OTHER PUBLICATIONS

International Search Report for PCT/US2023/028652 dated Nov. 28, 2023, 3 pages.
Machine assisted English translation of JPH02151660A obtained from <https://patents.google.com/patent> on Jan. 31, 2025, 7 pages.
Machine assisted English translation of JPH0245561A obtained from https://patents.google.com/patent on Jan. 31, 2025, 6 pages.

* cited by examiner

*Primary Examiner* — Marc S Zimmer
(74) *Attorney, Agent, or Firm* — Warner Norcross + Judd LLP

(57) ABSTRACT

A curable composition comprises: (A) an organopolysiloxane having an average of at least two silicon-bonded aliphatically unsaturated groups per molecule; (B) an organopolysiloxane free from aliphatically unsaturated groups and having an average of at least two mercapto groups per molecule; (C) a photoinitiator; (D) an acryloxy-functional silane; and (E) a tetraorthosilicate.

15 Claims, No Drawings

CURABLE COMPOSITION AND METHOD OF FORMING CURED PRODUCT

CROSS-REFERENCE TO RELATED APPLICATIONS

This application is the U.S. National Stage of International Application No. PCT/US2023/028652 filed on 26 Jul. 2023, which claims priority to, and all advantages of, U.S. Provisional Patent Application No. 63/393,964 filed on 31 Jul. 2022, the content of which is incorporated herein by reference.

TECHNICAL FIELD

The subject disclosure generally relates to a curable composition and, more specifically, to a curable silicone composition that can be cured via exposure to irradiation to give a cured product having excellent adhesion to a substrate, and to associated methods and articles.

BACKGROUND

Curable organopolysiloxane compositions are known in the art and utilized in myriad industries. Curable organopolysiloxane compositions can be cured via different curing conditions depending on functional groups present in or on the components of such curable organopolysiloxane compositions. Common curing conditions include exposure to heat, moisture, irradiation, etc. Different end use applications often dictate specific curing conditions utilized, e.g. certain curable organopolysiloxane compositions are utilized in end use applications where exposure to heat is undesirable. This is particularly the case for certain electronics applications, where it's not desirable to expose electronic components to elevated temperatures.

UV curing of curable organopolysiloxane compositions is often utilized in preparing cured products where it is desirable to cure in the absence of heat. Further still, certain substrates on which cured products are formed can have complex geometries or surface characteristics that result in shadow areas that are difficult to cure via UV radiation. Thus, it is often desirable to utilize dual cure systems that can be cured via both UV radiation and moisture (or another curing mechanism that does not necessitate elevated temperatures).

Certain types of functional groups are known to be capable of UV curing upon exposure to irradiation, including certain epoxy-functional organopolysiloxane compositions, acrylate-functional organopolysiloxane compositions, and thiol-ene functional organopolysiloxane compositions. Thiol-ene functional organopolysiloxane compositions are known to cure very quickly, including as compared to other functional groups known to be capable of UV curing. In addition, thiol-ene functional organopolysiloxane compositions are not inhibited by ambient oxygen, unlike acrylate-functional organopolysiloxane compositions, which further drives their cure speed in ambient conditions. However, conventional thiol-ene functional organopolysiloxane compositions, though capable of curing very quickly, have poor or undesirable adhesion to a substrate upon curing to form a cured product, often suffering from adhesive failure when removed from a substrate, which has limited their use.

BRIEF SUMMARY

Disclosed is a curable composition. The curable composition comprises (A) an organopolysiloxane having an average of at least two silicon-bonded aliphatically unsaturated groups per molecule. The composition further comprises (B) an organopolysiloxane free from aliphatically unsaturated groups and having an average of at least two mercapto groups per molecule. The composition also comprises (C) a photoinitiator. In addition, the composition comprises (D) an acryloxy-functional silane represented by the following formula:

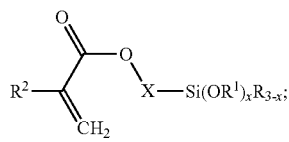

wherein X is a divalent hydrocarbon group, each R is independently a hydrocarbyl group, each $R^1$ is independently an alkyl group having from 1 to 8 carbon atoms, subscript x is 2 or 3, and $R^2$ is H or $R^1$. Finally, the composition comprises (E) a tetraorthosilicate of the formula $Si(OR^3)_4$, wherein each $R^3$ is independently an alkyl group having from 1 to 10 carbon atoms.

Also disclosed is a method of forming a cured product. The method comprises the step of applying the composition to a surface of a substrate. The method further comprises the step of irradiating the composition on the substrate to give the cured product. The cured product disposed on a substrate formed in accordance with the method is also disclosed.

DETAILED DESCRIPTION

A curable composition ("the composition"), a method of forming a cured product on a substrate with the composition, and the cured product formed thereby are disclosed and described in detail below. The composition forms a cured product having excellent adhesion to the substrate, and can be utilized in myriad end use applications.

The composition comprises (A) an organopolysiloxane having an average of at least two silicon-bonded aliphatically unsaturated groups per molecule. As understood by those of skill in the art, organopolysiloxanes comprise inorganic silicon-oxygen-silicon groups (i.e., —Si—O—Si—), with organosilicon and/or organic side groups attached to the silicon atoms in M, D, and/or T siloxy units. Organopolysiloxanes are typically characterized in terms of the number, type, and/or proportion of [M], [D], [T], and/or [Q] units/siloxy groups, which each represent structural units of individual functionality present in organopolysiloxane resins. In particular, [M] represents a monofunctional unit of general formula $R''_3SiO_{1/2}$; [D] represents a difunctional unit of general formula $R''_2SiO_{2/2}$; [T] represents a trifunctional unit of general formula $R''SiO_{3/2}$; and [Q] represents a tetrafunctional unit of general formula $SiO_{4/2}$, as shown by the general structural moieties below:

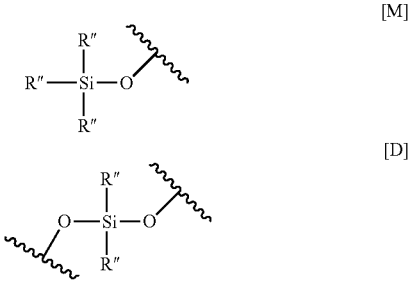

[T]

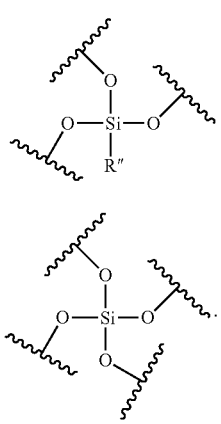

[Q]

In these general structural moieties, each R″ is independently a monovalent or polyvalent substituent. As understood in the art, specific substituents suitable for each R″ are not particularly limited (e.g. may be monoatomic or polyatomic, organic or inorganic, linear or branched, substituted or unsubstituted, aromatic, aliphatic, saturated or unsaturated, etc., as well as various combinations thereof).

One of skill in the art understands how [M], [D], [T] and [Q] units, and their relative proportions (i.e., molar fractions) influence and control the structure of siloxanes, and that polysiloxanes in general may be monomeric, polymeric, oligomeric, linear, branched, partly-branched, hyperbranched, cyclic, dendritic, and/or resinous depending on the selection of [M], [D], [T] and/or [Q] units therein. For example, [T] units and/or [Q] units are present in organopolysiloxane resins, whereas linear organopolysiloxanes are typically free from such [T] units and/or [Q] units.

As introduced above, the (A) organopolysiloxane has an average of at least two silicon-bonded aliphatically unsaturated groups per molecule. The silicon-bonded aliphatically unsaturated groups may independently be alkenyl and/or alkynyl groups. "Alkenyl" means an acyclic, branched or unbranched, monovalent hydrocarbon group having one or more carbon-carbon double bonds. Specific examples thereof include vinyl groups, allyl groups, hexenyl groups, and octenyl groups. "Alkynyl" means an acyclic, branched or unbranched, monovalent hydrocarbon group having one or more carbon-carbon triple bonds. Specific examples thereof include ethynyl, propynyl, and butynyl groups. Various examples of aliphatically unsaturated groups suitable for the (A) organopolysiloxane include $CH_2=CH-$, $CH_2=CHCH_2-$, $CH_2=CH(CH_2)_4-$, $CH_2=CH(CH_2)_6-$, $CH_2=C(CH_3)CH_2-$, $H_2C=C(CH_3)-$, $H_2C=C(CH_3)-$, $H_2C=C(CH_3)CH_2-$, $H_2C=CHCH_2CH_2-$, $H_2C=CHCH_2CH_2CH_2-$, $HC\equiv C-$, $HC\equiv CCH_2-$, $HC\equiv CCH(CH_3)-$, $HC\equiv CC(CH_3)_2-$, and $HC\equiv CC(CH_3)_2CH_2-$. Typically, the aliphatic unsaturation is terminal in each aliphatically unsaturated group. As understood in the art, aliphatic unsaturation may be referred to as ethylenic unsaturation.

The (A) organopolysiloxane is not limited and may be any organopolysiloxane including an average of at least two silicon-bonded aliphatically unsaturated groups per molecule. For example, the (A) organopolysiloxane may be linear, branched, partly branched, cyclic, resinous (i.e., have a three-dimensional network), or may comprise a combination of different structures.

In certain embodiments, the (A) organopolysiloxane has the following average formula:

$$R_{q'}SiO_{(4-q')/2}$$

wherein each R is an independently selected substituted or unsubstituted hydrocarbyl group with the proviso that in each molecule, on average, at least two R groups are independently selected aliphatically unsaturated groups, and wherein q' is selected such that $0<a'\leq 3.2$.

In certain embodiments, the (A) organopolysiloxane is represented by the following average formula:

$$(R^4_{3-m}R^5_mSiO_{1/2})_a(R^4_{2-n}R^5_nSiO_{2/2})_b(R^5SiO_{3/2})_c(SiO_{4/2})_d(ZO_{1/2})_e$$

wherein each $R^4$ is an independently selected substituted or unsubstituted hydrocarbyl group free from aliphatic unsaturation; each $R^5$ is independently $R^4$ or an aliphatically unsaturated group having from 1 to 10 carbon atoms; each subscript m is independently an integer from 0 to 3 in each unit indicated by subscript a; each subscript n is an integer from 0 to 2 in each unit indicated by subscript b; with the proviso that at least two of $R^5$ are aliphatically unsaturated groups; each Z is independently H or an alkyl group; and wherein a, b, c, d, and e are mole fractions satisfying the following: $a>0$; $b>0$; $c\geq 0$; $d\geq 0$; $0\leq e\leq 0.05$; and $a+b+c+d+e=1$. One of skill in the art understands how such M, D, T, and Q units and their molar fractions influence subscript f in the average formula above. T and Q units, indicated by subscripts c and d, respectively, are typically present in silicone resins, whereas D units, indicated by subscript b, are typically present in silicone polymers (and may also be present in silicone resins).

In general, hydrocarbyl groups suitable for $R^4$ may independently be linear, branched, cyclic, or combinations thereof. $R^4$ is free from aliphatic unsaturation, i.e., each $R^4$ is not an alkenyl or an alkynyl group. Cyclic hydrocarbyl groups encompass aryl groups as well as saturated or non-conjugated cyclic groups. Cyclic hydrocarbyl groups may independently be monocyclic or polycyclic. One example of a combination of a linear and cyclic hydrocarbyl group is an aralkyl group. General examples of hydrocarbyl groups include alkyl groups, aryl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, octadecyl, as well as branched saturated hydrocarbon groups having from 6 to 18 carbon atoms. Examples of suitable non-conjugated cyclic groups include cyclobutyl, cyclohexyl, and cycyloheptyl groups. Examples of suitable aryl groups include phenyl, tolyl, xylyl, naphthyl, benzyl, and dimethyl phenyl. Examples of suitable monovalent halogenated hydrocarbon groups (i.e., halocarbon groups, or substituted hydrocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups. In specific embodiments, each $R^4$ is independently an alkyl group having from 1 to 10 carbon atoms, alternatively from 1 to 8 carbon atoms, alternatively from 1 to 6 carbon atoms, alternatively from 1 to 4 carbon atoms, alternatively from 1 to 2 carbon atoms, alternatively each $R^4$ is a methyl group.

Each $R^5$ is independently $R^4$ or an aliphatically unsaturated group having from 1 to 10 carbon atoms. Suitable examples of aliphatically unsaturated groups are set forth above. Each subscript m is independently an integer from 0 to 3 in each unit indicated by subscript a. Subscript a indicates an M siloxy unit, and thus each M siloxy unit is independently selected. By way of example, the (A) organopolysiloxane can include trimethylsiloxy units as M units (i.e., when subscript m is 0 and each $R^4$ is methyl), dimethylvinylsiloxy units as M units (i.e., when subscript m is 1, each $R^4$ is methyl, and $R^5$ is vinyl), methyldivinylsiloxy units as M units (i.e., when subscript m is 2, $R^4$ is methyl, and each $R^5$ is vinyl), and/or trivinylsiloxy units as M units (i.e., when subscript m is 3, and each $R^5$ is vinyl).

Similarly, each subscript n is an integer from 0 to 2 in each unit indicated by subscript b. Subscript b indicates a D siloxy unit, and thus each D siloxy unit is independently selected. By way of example, the (A) organopolysiloxane can include dimethylsiloxy units as D units (i.e., when subscript n is 0 and each $R^4$ is methyl), phenylmethylsiloxy units as D units (i.e., when subscript n is 0, one $R^4$ is methyl, and the other $R^4$ is phenyl), methylvinylsiloxy units as D units (i.e., when subscript n is 1, $R^4$ is methyl, and $R^5$ is vinyl), and/or divinylsiloxy units as D units (i.e., when subscript n is 2, and each $R^5$ is vinyl). One of skill in the art understands how each methyl group may be replaced with another hydrocarbyl group (which is optionally substituted), and how each vinyl group may be replaced with another aliphatically unsaturated group.

Subscript e indicates the SiOZ content of the (A) organopolysiloxane. SiOZ content can be SiOH (or a silanol group, where Z is H), or silicon-bonded alkoxy (where Z is alkyl). Said differently, each Z is independently H or an alkyl group. For example, "$(SiO_{4/2})(ZO_{1/2})$" refers to a Q3-type group with a silicon atom bound through a single oxygen to a "Z" group. Under NMR nomenclature, such "$(SiO_{4/2})(ZO_{1/2})$" moieties are still considered Q siloxy units. When Z is an alkyl group, the alkyl group is typically a C1-C8, alternatively a C1-C6, alternatively a C1-C4, alternatively a C1-C2, alternatively a C1 (i.e., methyl) alkyl group. In the (A) organopolysiloxane, $0 \leq e \leq 0.05$, alternatively $0 \leq e \leq 0.04$, alternatively $0 \leq e \leq 0.03$, alternatively $0 \leq e \leq 0.02$, alternatively $0 \leq e \leq 0.01$, alternatively e is 0. Subscript e is typically 0 when the (A) organopolysiloxane is linear or branched, but may be >0 when the (A) organopolysiloxane is resinous. Such SiOZ moieties are often inherently present in silicone resins prepared via hydrolysis and condensation of silanes.

In specific embodiments, the (A) organopolysiloxane is resinous. When the (A) organopolysiloxane is resinous, subscript c>0 and/or subscript d>0 such that the (A) organopolysiloxane includes at least some T and/or Q siloxy units, respectively. In one embodiment, c>0 and d is 0. In another embodiment, c is 0 and d>0. In yet other embodiments, each of c and d are >0. In these embodiments, the (A) organopolysiloxane has a branched or a three dimensional network molecular structure. At 25° C., the (A) organopolysiloxane may be in a liquid or in a solid form. Alternatively, the (A) organopolysiloxane may be exemplified by a polyorganosiloxane that comprises only T units, a polyorganosiloxane that comprises T units in combination with other siloxy units (e.g. M, D, and/or Q siloxy units), or a polyorganosiloxane comprising Q units in combination with other siloxy units (i.e., M, D, and/or T siloxy units). Specific examples of resinous organopolysiloxanes suitable for the (A) organopolysiloxane include a vinyl-terminated silsesquioxane (i.e., T resin) and a vinyl-terminated MDQ resin. Alternatively, the (A) organopolysiloxane may comprise a branched siloxane, a silsesquioxane, or both a branched siloxane and a silsesquioxane.

When the (A) organopolysiloxane is branched, the (A) organopolysiloxane may have unit formula: $(R^4_{3-m}R^5_{m}SiO_{1/2})_a(R^4_{2-n}R^5_{n}SiO_{2/2})_b(SiO_{4/2})_d(ZO_{1/2})_e$, where each $R^4$ is independently selected and defined above, each $R^5$ is independently selected and defined above, subscript a>0, subscript b>0, subscript d>0, and subscript e is ≤0.05. The (A) organopolysiloxane may include a single Q siloxy unit, or two or more Q siloxy units, which may optionally be clustered or bonded together.

When the (A) organopolysiloxane is branched, the (A) organopolysiloxane may contain at least two polydiorganosiloxane chains of formula $(R^4_{2}SiO_{2/2})_m$, where each subscript m is independently 2 to 5,000. Alternatively, when the (A) organopolysiloxane is branched, the (A) organopolysiloxane may comprise at least one unit of formula $(SiO_{4/2})$ bonded to four polydiorganosiloxane chains of formula $(R^4_{2}SiO_{2/2})_o$, where each subscript o is independently 1 to 2,500.

However, the (A) organopolysiloxane is typically free from such T and Q siloxy units. By "at least some," it is meant that the (A) organopolysiloxane may include up to 5, alternatively up to 4, alternatively up to 3, alternatively up to 2, alternatively up to 1, alternatively 0, mol % T and Q siloxy units based on all siloxy units present in the (A) organopolysiloxane. Typically, in view of desired viscosities, the (A) organopolysiloxane is a flowable liquid at room temperature, including in the absence of any solvent or carrier vehicle, rather than a gum or resin. While gums or resins can be liquid at room temperature when solubilized or dispersed in a solvent or carrier fluid, such solvents can be undesirable in certain end use applications, as solvents are typically volatilized or otherwise removed during a curing process.

In certain embodiments, the (A) organopolysiloxane is substantially linear. By substantially linear, it is meant that component (A) comprises, consists essentially of, or consists of only M and D siloxy units. As readily understood in the art, M siloxy units are of formula $(R^4_{3-m}R^5_{m}SiO_{1/2})$ and D siloxy units are of formula $(R^4_{2-n}R^5_{n}SiO_{2/2})$, where subscripts m and n, and $R^4$ and $R^5$ are defined above. Traditionally, M and D siloxy nomenclature is utilized in connection with only methyl substitution. However, for purposes of this disclosure, in the M and D siloxy units above, each $R^4$ and $R^5$ are as defined above, and are not required to be methyl groups. When an M siloxy unit includes at least one silicon-bonded aliphatically unsaturated group, the silicon-bonded aliphatically unsaturated group is terminal. When a D siloxy unit includes at least one silicon-bonded aliphatically unsaturated group, the silicon-bonded aliphatically unsaturated group is pendent.

In specific embodiments in which the (A) organopolysiloxane is substantially linear, the (A) organopolysiloxane is represented by the following average formula:

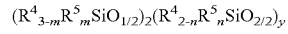

wherein subscript y is an integer from 10 to 10,000; and $R^4$, $R^5$, and subscripts m and n are independently selected and defined above. The value of subscript y is from 10 to 10,000. In one embodiment, subscript y is from 10 to 10,000, alternatively from 10 to 9,000, alternatively from 10 to 8,000, alternatively from 10 to 7,000, alternatively from 10 to 6,000, alternatively from 10 to 5,000, alternatively from 10 to 4,000, alternatively from 10 to 3,000, alternatively from 10 to 2,000, alternatively from 10 to 1,000, alternatively from 50 to 900. When the (A) organopolysiloxane is substantially linear, the value of subscript y may be referred to as the degree of polymerization (DP) of the (A) organopolysiloxane.

When the (A) organopolysiloxane is substantially linear, alternatively is linear, the at least two aliphatically unsaturated groups may be bonded to silicon atoms in pendent positions, terminal positions, or in both pendent and terminal locations.

In one embodiment when the (A) organopolysiloxane is substantially linear, each subscript m is 1 and each subscript n is 0 such that the (A) organopolysiloxane is represented by the following average formula: $(R^4{}_2R_5SiO_{1/2})_2(R^4{}_2SiO_{2/2})_y$. For example, as a specific example of the (A) organopolysiloxane having an average, per molecule, of at least two silicon-bonded aliphatically unsaturated groups, the (A) organopolysiloxane may have the average formula: $Vi(CH_3)_2SiO[(CH_3)_2SiO]_ySi(CH_3)_2Vi$, where subscript y and Vi are defined above. With regard to this average formula, any methyl group may be replaced with a different monovalent hydrocarbon group, and any vinyl group may be replaced with any terminally aliphatically unsaturated monovalent hydrocarbon group.

As a specific example of the (A) organopolysiloxane having pendant silicon-bonded aliphatically unsaturated groups, the (A) organopolysiloxane may have the average unit formula:

where subscript bb is from 2 to 20, alternatively from 2 to 10, subscript cc is from 8 to 9,980, and Vi indicates a vinyl group. With regard to this average formula, any methyl group may be replaced with a different monovalent hydrocarbon group (such as alkyl or aryl), and any vinyl group may be replaced with a different aliphatically unsaturated monovalent hydrocarbon group (such as allyl or hexenyl).

Because the at least two silicon-bonded aliphatically unsaturated groups may be both pendent and terminal, the (A) organopolysiloxane may alternatively have the average unit formula:

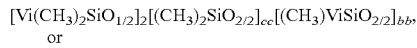
or
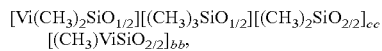

where subscripts bb and cc and Vi are defined above.

When the (A) organopolysiloxane is the substantially linear polyorganosiloxane, the (A) organopolysiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

Alternatively, the (A) organopolysiloxane may comprise a substantially linear, alternatively linear, polyorganosiloxane selected from the group consisting of:
i) dimethylvinylsiloxy-terminated polydimethylsiloxane,
ii) dimethylvinylsiloxy-terminated poly(dimethylsiloxane/methylvinylsiloxane),
iii) dimethylvinylsiloxy-terminated polymethylvinylsiloxane,
iv) trimethylsiloxy-terminated poly(dimethylsiloxane/methylvinylsiloxane),
v) trimethylsiloxy-terminated polymethylvinylsiloxane,
vi) dimethylvinylsiloxy-terminated poly(dimethylsiloxane/methylvinylsiloxane),
vii) dimethylvinylsiloxy-terminated poly(dimethylsiloxane/methylphenylsiloxane),
viii) dimethylvinylsiloxy-terminated poly(dimethylsiloxane/diphenylsiloxane),
ix) phenyl,methyl,vinyl-siloxy-terminated polydimethylsiloxane,
x) dimethylhexenylsiloxy-terminated polydimethylsiloxane,
xi) dimethylhexenylsiloxy-terminated poly(dimethylsiloxane/methylhexenylsiloxane),
xii) dimethylhexenylsiloxy-terminated polymethylhexenylsiloxane,
xiii) trimethylsiloxy-terminated poly(dimethylsiloxane/methylhexenylsiloxane),
xiv) trimethylsiloxy-terminated polymethylhexenylsiloxane
xv) dimethylhexenyl-siloxy terminated poly(dimethylsiloxane/methylhexenylsiloxane),
xvi) dimethylvinylsiloxy-terminated poly(dimethylsiloxane/methylhexenylsiloxane),
xvii) dimethylvinylsiloxy-terminated polymethylphenylsiloxane,
xviii) dimethylvinylsiloxy-terminated polydimethylsiloxane/methylphenylsiloxane, and
xix) a combination thereof.

The (A) organopolysiloxane may comprise a combination or two or more different polyorganosiloxanes that differ in at least one property such as structure, molecular weight, degree of polymerization, monovalent groups bonded to silicon atoms, and/or content of aliphatically unsaturated groups.

For example, in one embodiment, the (A) organopolysiloxane may comprise (A1) a first organopolysiloxane and (A2) a second organopolysiloxane. The (A1) first organopolysiloxane and (A2) second organopolysiloxane are different from one another. In one embodiment, the (A1) first organopolysiloxane is linear and the (A2) second organopolysiloxane is not linear. In other embodiments, both the (A1) first organopolysiloxane and the (A2) second organopolysiloxane are linear.

Generally, the (A1) first organopolysiloxane and the (A2) second organopolysiloxane each have an average of at least two silicon-bonded aliphatically unsaturated groups per molecule. In some embodiments, both the (A1) first organopolysiloxane and the (A2) second organopolysiloxane have the same general formula, but differ solely in terms of degree of polymerization. The (A1) first organopolysiloxane and the (A2) second organopolysiloxane may each independently be linear, substantially linear, branched, substantially branched, resinous, or substantially resinous.

In embodiments where the (A1) first organopolysiloxane is linear, the (A1) first organopolysiloxane may have a degree of polymerization of from 10 to 10,000, alternatively 10 to 9,000, alternatively 10 to 8,000, alternatively 10 to 7,000, alternatively from 10 to 6,000, alternatively from 10 to 5,000, alternatively from 10 to 4,000, alternatively from 10 to 3,000, alternatively from 10 to 2,000, alternatively from 250 to 1,500, alternatively from 500 to 1,000, alternatively from 600 to 900, alternatively from 700 to 800. In these or other embodiments where the (A2) second organopolysiloxane is linear, the (A2) second organopolysiloxane has a degree of polymerization of from 10 to 10,000, alternatively from 10 to 7,500, alternatively from 10 to 5,000, alternatively from 10 to 2,500, alternatively from 10 to 1,000, alternatively from 10 to 750, alternatively from 50 to 500, alternatively from 50 to 300, alternatively from 100 to 200.

The (A1) first organopolysiloxane and the (A2) second organopolysiloxane may independently have terminal and/or pendant silicon-bonded aliphatically unsaturated groups. In some embodiments, the (A1) first organopolysiloxane and the (A2) second organopolysiloxane have no pendant silicon-bonded aliphatically unsaturated groups.

When the (A) organopolysiloxane comprises the (A1) first organopolysiloxane and the (A2) second organopolysiloxane, the weight ratio of the (A1) first organopolysiloxane to the (A2) second organopolysiloxane is not limited. In some embodiments, the weight ratio of the (A1) first organopolysiloxane to the (A2) second organopolysiloxane is from 100:1 to 1:100, alternatively 50:1 to 1:50, alternatively 25:1 to 1:25, alternatively 10:1 to 1:10, alternatively 5:1 to 1:5, alternatively 3:1 to 1:3, alternatively 2:1 to 1:2, alternatively 1.5:1 to 1:1.5, alternatively 1.2:1 to 1:1.2, alternatively 1.1:1 to 1:1.1, or alternatively 1.15:1 to 1:1.15. In certain embodiments in which the (A) the organopolysiloxane comprises the (A1) first organopolysiloxane and the (A2) second organopolysiloxane, the (A1) first organopolysiloxane is present in the composition in an amount of from 1 to 89, alternatively from 10 to 80, alternatively from 20 to 60, alternatively from 20 to 40, alternatively from 25 to 35, alternatively from 28 to 32, wt. % based on the total weight of the composition. In these or other embodiments, the (A2) second organopolysiloxane is present in the composition in an amount of from 1 to 89, alternatively from 10 to 80, alternatively from 20 to 60, alternatively from 20 to 40, alternatively from 25 to 35, alternatively from 30 to 35, wt. % based on the total weight of the composition.

Regardless of the selection of the (A) organopolysiloxane, the (A) organopolysiloxane is typically present in the composition in an amount of from 5 to 95, alternatively from 10 to 90, alternatively from 20 to 90 alternatively from 30 to 90, alternatively from 50 to 90, wt. % based on the total weight of the composition. In specific embodiments, the (A) organopolysiloxane is present in the composition in an amount of from 10 to 80, alternatively from 20 to 70, alternatively from 20 to 80, alternatively from 30 to 70, alternatively from 40 to 70, alternatively from 50 to 70, alternatively from 55 to 65, wt. %, based on the total weight of the composition.

The composition further comprises (B) an organopolysiloxane free from aliphatically unsaturated groups and having an average of at least two mercapto groups per molecule.

The (B) organopolysiloxane is not limited and may be any organopolysiloxane including an average of at least two mercapto groups per molecule. For example, the (B) organopolysiloxane may be linear, branched, partly-branched, hyperbranched, cyclic, dendritic, resinous (i.e., have a three-dimensional network), or may comprise a combination of different structures. The at least two mercapto groups of component (B) are reactive with the silicon-bonded aliphatically unsaturated groups of component (A). Reference herein to mercapto groups includes any group having mercapto functionality, e.g. reference to mercapto groups includes reference to mercaptoalkyl groups, and not just —SH groups.

In certain embodiments, the (B) organopolysiloxane has the following average formula:

wherein each R' is an independently selected substituted or unsubstituted hydrocarbyl group free from aliphatic unsaturation, with the proviso that in each molecule, on average, at least two R' groups are independently selected mercapto functional groups, and wherein q" is selected such that $0<q''\leq 3.2$.

In some embodiments, the (B) organopolysiloxane is represented by the following average formula:

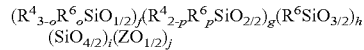

wherein each $R^4$ is an independently selected substituted or unsubstituted hydrocarbyl group free from aliphatic unsaturation; each $R^6$ is independently $R^4$ or comprises a mercapto group; subscript o is independently an integer from 0 to 3 in each unit indicated by subscript f; each p is independently an integer from 0 to 2 in each unit indicated by subscript f; with the proviso that at least two of $R^6$ independently comprise mercapto groups; each Z is independently H or an alkyl group; wherein f, g, h, i, and j are mole fractions satisfying the following: f>0; g>0; h≥0; i≥0; 0≤j≤0.05 and f+g+h+i+j=1.

Suitable examples of $R^4$ are described above with respect to component (A).

Each $R^6$ is independently $R^4$ or comprises a mercapto group. Each mercapto group of $R^6$ may be any group comprising mercapto (SH) functionality. In certain embodiments, each mercapto group of $R^6$ are independently of formula —$X^1$—SH, where $X^1$ is a divalent hydrocarbon group. In these embodiments, $X^1$ is present between a silicon atom of component (B) and a sulfur atom of the mercapto group. Typically, $X^1$ is selected such that each mercapto group of $R^6$ is a mercaptoalkyl group. In these embodiments, each mercapto group of $R^6$ can be written as $(CH_2)_tSH$, where subscript t is independently from 1 to 10, alternatively from 1 to 9, alternatively from 1 to 8, alternatively from 1 to 7, alternatively from 2 to 6. Examples of the divalent hydrocarbon groups when subscript t is from 1 to 8 include alkylene groups with 1 to 8 carbon atoms, such as methylene groups, ethylene groups, propylene groups, butylene groups, pentylene groups, hexylene groups, heptylene groups, and octylene groups. One of skill in the art understands the corresponding mercapto groups based on the selection of $X^1$. For example, when subscript t is 3, the corresponding mercapto group is a 3-mercaptopropyl group; when subscript t is 4, the corresponding mercapto group is a 4-mercaptobutyl group, and when subscript t is 6, the corresponding mercapto group is a 6-mercaptohexyl group. Each mercapto group is not required to be a primary mercapto group. For example, each mercapto group can independently be primary, seconday, or tertiary. In certain embodiments, each merapto group is primary.

Each subscript o is independently an integer from 0 to 3 in each unit indicated by subscript f. Subscript f indicates an M siloxy unit, and thus each M siloxy unit is independently selected. By way of example, the (B) organopolysiloxane can include trimethylsiloxy units as M units (i.e., when subscript o is 0 and each $R^4$ is methyl), dimethylmercaptosiloxy units as M units (i.e., when subscript o is 1, each $R^4$ is methyl, and $R^6$ is a mercapto group), methyldimercaptosiloxy units as M units (i.e., when subscript o is 2, $R^4$ is methyl, and each $R^6$ is a mercapto group), and/or trimercaptosiloxy units as M units (i.e., when subscript o is 3, and each $R^6$ is a mercapto group).

Similarly, each subscript p is an integer from 0 to 2 in each unit indicated by subscript g. Subscript p indicates a D siloxy unit, and thus each D siloxy unit is independently selected. By way of example, the (B) organopolysiloxane can include dimethylsiloxy units as D units (i.e., when subscript p is 0 and each $R^4$ is methyl), methylmercaptosiloxy units as D units (i.e., when subscript p is 1, $R^4$ is methyl, and $R^6$ is a mercapto group), and/or dimercaptosiloxy units as D units (i.e., when subscript p is 2, and each $R^6$ is a mercapto group). One of skill in the art understands how each methyl group may be replaced with another hydrocarbyl group (which is optionally substituted), and how each mercapto group may be replaced with another mercapto group.

Subscript j indicates the SiOZ content of the (B) organopolysiloxane. SiOZ content can be SiOH (where Z is H, or a silanol group), or silicon-bonded alkoxy (where Z is alkyl). Said differently, each Z is independently H or an alkyl group. For example, "$(SiO_{4/2})(ZO_{1/2})$" refers to a Q-type group with a silicon atom bound through a single oxygen to a "Z" group. Under NMR nomenclature, such "$(SiO_{4/2})(ZO_{1/2})$" moieties are still considered Q siloxy units. When Z is an alkyl group, the alkyl group is typically a C1-C8, alternatively a C1-C6, alternatively a C1-C4, alternatively a C1-C2, alternatively a C1 (i.e., methyl) alkyl group. In the (B) organopolysiloxane, $0 \leq j \leq 0.05$, alternatively $0 \leq j \leq 0.04$, alternatively $0 \leq j \leq 0.03$, alternatively $0 \leq j \leq 0.02$, alternatively $0 \leq j \leq 0.01$, alternatively j is 0. Subscript j is typically 0 when the (B) organopolysiloxane is linear or branched, but may be >0 when the (B) organopolysiloxane is resinous. Such SiOZ moieties are often inherently present in silicone resins prepared via hydrolysis and condensation of silanes.

In specific embodiments, the (B) organopolysiloxane is resinous. When the (B) organopolysiloxane is resinous, subscript h>0 and/or subscript i>0 such that the (B) organopolysiloxane includes at least some T and/or Q siloxy units, respectively. In one embodiment, h>0 and i is 0. In another embodiment, h is 0 and i>0. In yet other embodiments, each of h and i is >0. In these embodiments, the (B) organopolysiloxane has a branched or a three dimensional network molecular structure. At 25° C., the (B) organopolysiloxane may be in a liquid or in a solid form. Alternatively, the (B) organopolysiloxane may be exemplified by a polyorganosiloxane that comprises only T units, a polyorganosiloxane that comprises T units in combination with other siloxy units (e.g., M, D, and/or Q siloxy units), or a polyorganosiloxane comprising Q units in combination with other siloxy units (i.e., M, D, and/or T siloxy units). Specific examples of resinous organopolysiloxanes suitable for the (B) organopolysiloxane include a mercapto-terminated silsesquioxane (i.e., T resin) and a mercapto-terminated MDQ resin. Alternatively, the (B) organopolysiloxane may comprise a branched siloxane, a silsesquioxane, or both a branched siloxane and a silsesquioxane.

However, the (B) organopolysiloxane is typically free from such T and Q siloxy units. By "at least some," it is meant that the (B) organopolysiloxane may include up to 5, alternatively up to 4, alternatively up to 3, alternatively up to 2, alternatively up to 1, alternatively 0, mol % T and Q siloxy units based on all siloxy units present in the (B) organopolysiloxane. Typically, in view of desired viscosities, the (B) organopolysiloxane is a flowable liquid at room temperature, including in the absence of any solvent or carrier vehicle, rather than a gum or resin. While gums or resins can be liquid at room temperature when solubilized or dispersed in a solvent or carrier fluid, such solvents can be undesirable in certain end use applications, as solvents are typically volatilized or otherwise removed during a curing process.

In certain embodiments, the (B) organopolysiloxane is substantially linear. By substantially linear, it is meant that component (B) comprises, consists essentially of, or consists of only M and D siloxy units. As readily understood in the art, M siloxy units are of formula ($R^4_{3-o}R^6_oSiO_{1/2}$) and D siloxy units are of formula ($R^4_{2-p}R^6_pSiO_{2/2}$), where subscripts o and p, and $R^4$ and $R^6$ are defined above. Traditionally, M and D siloxy nomenclature is utilized in connection with only methyl substitution. However, for purposes of this disclosure, in the M and D siloxy units above, each $R^4$ and $R^6$ are as defined above, and are not required to be methyl groups. When an M siloxy unit includes at least one mercapto group, the mercapto group is terminal. When a D siloxy unit includes at least one mercapto group, the mercapto group is pendent.

In specific embodiments in which the (B) organopolysiloxane is substantially linear, the (B) organopolysiloxane is represented by the following average formula:

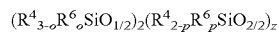

$(R^4_{3-o}R^6_oSiO_{1/2})_2(R^4_{2-p}R^6_pSiO_{2/2})_z$ wherein subscript z is an integer from 10 to 10,000; and $R^4$, $R^6$, and subscripts o and p are independently selected and defined above. The value of subscript z is from 10 to 10,000. In one embodiment, subscript z is from 10 to 10,000, alternatively from 10 to 9,000, alternatively from 10 to 8,000, alternatively from 10 to 7,000, alternatively from 10 to 6,000, alternatively from 10 to 5,000, alternatively from 10 to 4,000, alternatively from 10 to 3,000, alternatively from 10 to 2,000, alternatively from 10 to 1,000, alternatively from 10 to 500, alternatively from 10 to 250, alternatively from 10 to 100, alternatively from 20 to 80, alternatively from 30 to 60. When the (B) organopolysiloxane is substantially linear, the value of subscript z may be referred to as the degree of polymerization (DP) of the (B) organopolysiloxane.

When the (B) organopolysiloxane is substantially linear, alternatively is linear, the at least two mercapto groups may be in pendent positions, terminal positions, or in both pendent and terminal locations.

In one embodiment when the (B) organopolysiloxane is substantially linear and has pendent mercapto groups, subscript o is 0 and the (B) organopolysiloxane has the average unit formula:

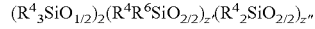

$(R^4_3SiO_{1/2})_2(R^4R^6SiO_{2/2})_{z'}(R^4_2SiO_{2/2})_{z''}$ wherein z' is an integer from 2 to 100, subscript z" is an integer of from 8 to 9998, with the proviso that $10 \leq z'+z'' \leq 10,000$. Typically, z' is from 2 to 80, alternatively from 2 to 60, alternatively from 2 to 40, alternatively from 2 to 20, alternatively from 2 to 10, and z″ is from 8 to 9,000, alternatively from 8 to 7,000, alternatively from 8 to 5,000, alternatively from 8 to 3000, alternatively from 8 to 1,000, alternatively from 10 to 500, alternatively from 10 to 100. For example, as a specific example of the (A) organopolysiloxane having pendant mercapto groups, the (B) organopolysiloxane may have the average formula:

$$[(CH_3)_3SiO_{1/2}]_2[(CH_3)R^6SiO_{2/2}]_{z'}[(CH_3)_2SiO_{2/2}]_{z''}$$

With regard to this average formula, any methyl group may be replaced with a different monovalent hydrocarbon group (such as alkyl or aryl).

Alternatively, as a specific example of the (B) organopolysiloxane having an average, per molecule, of at least two mercapto groups in terminal positions, the (B) organopolysiloxane may have the average formula: $R^6(CH_3)_2SiO[(CH_3)_2SiO]_zSi(CH_3)_2R^6$, where subscript z and $R^6$ are defined above. With regard to this average formula, any methyl group may be replaced with a different monovalent hydrocarbon group.

Because the at least two mercapto groups may be both pendent and terminal, the (B) organopolysiloxane may alternatively have the average unit formula:

$$[R^6(CH_3)_2SiO_{1/2}]_2[(CH_3)R^6SiO_{2/2}]_{z'}[(CH_3)_2SiO_{2/2}]_{z''},$$
or
$$[R^6(CH_3)_2SiO_{1/2}][(CH_3)_3SiO_{1/2}][(CH_3)R^6SiO_{2/2}]_{z'}[(CH_3)_2SiO_{2/2}]_{z''}.$$

When the (B) organopolysiloxane is the substantially linear polyorganosiloxane, the (B) organopolysiloxane can be exemplified by a dimethylpolysiloxane capped at both molecular terminals with dimethylmercaptolsiloxy groups, a methylphenylpolysiloxane capped at both molecular terminals with dimethylmercaptosiloxy groups, a copolymer of a methylphenylsiloxane and dimethylsiloxane capped at both molecular terminals with dimethylmercaptosiloxy groups, a copolymer of a methylmercaptosiloxane and a methylphenylsiloxane capped at both molecular terminals with dimethylmercaptosiloxy groups, a copolymer of a methylmercaptosiloxane and diphenylsiloxane capped at both molecular terminals with dimethylmercaptosiloxy groups, a copolymer of a methylmercaptosiloxane, methylphenylsiloxane, and dimethylsiloxane capped at both molecular terminals with dimethymercaptosiloxy groups, a copolymer of a methylmercaptosiloxane and a methylphenylsiloxane capped at both molecular terminals with trimethylsiloxy groups, a copolymer of a methylmercaptosiloxane and diphenylsiloxane capped at both molecular terminals with trimethylsiloxy groups, a copolymer of dimethylsiloxane and methylmercaptosiloxane capped at both molecular terminals with trimethylsiloxy groups, and a copolymer of a methylmercaptosiloxane, methylphenylsiloxane, and a dimethylsiloxane capped at both molecular terminals with trimethylsiloxy groups.

Alternatively, the (B) organopolysiloxane may comprise a substantially linear, alternatively linear, polyorganosiloxane selected from the group consisting of:
i) dimethylmercaptosiloxy-terminated polydimethylsiloxane,
ii) dimethylmercaptosiloxy-terminated poly(dimethylsiloxane/methylmercaptosiloxane),
iii) dimethylmercaptosiloxy-terminated polymethylmercaptosiloxane,
iv) trimethylsiloxy-terminated poly(dimethylsiloxane/methylmercaptosiloxane),
v) trimethylsiloxy-terminated polymethylmercaptosiloxane,
vi) dimethylmercaptosiloxy-terminated poly(dimethylsiloxane/methylmercaptosiloxane),
vii) dimethylmercaptosiloxy-terminated poly(dimethylsiloxane/methylphenylsiloxane),
viii) dimethylmercaptosiloxy-terminated poly(dimethylsiloxane/diphenylsiloxane),
ix) phenyl,methyl,mercapto-siloxy-terminated polydimethylsiloxane, and
x) a combination thereof.

The (B) organopolysiloxane may comprise a combination or two or more different polyorganosiloxanes that differ in at least one property such as structure, molecular weight, degree of polymerization, monovalent groups bonded to silicon atoms, and/or content of aliphatically unsaturated groups.

In some embodiments, the (B) organopolysiloxane is present in the composition in an amount of from 0.5 to 40, alternatively from 0.5 to 30, alternatively from 0.5 to 20, alternatively from 1 to 15, alternatively from 5 to 15, alternatively from 7 to 12, wt. % based on the total weight of the composition.

In these or other embodiments, the content of component (B) is selected to give a weight ratio of the (A) organopolysiloxane to the (B) organopolysiloxane of from 100:1 to 1:100, alternatively from 50:1 to 1:50, alternatively from 25:1 to 1:25, alternatively from 15:1 to 1:15, alternatively from 15:1 to 1:1, or alternatively from 12:1 to 3:1 (wt/wt (A):(B)).

The composition further comprises (C) a photoinitiator. The (C) photoinitiator is selected to enhance curing of the composition upon exposure to irradiation. The (C) photoinitiator may be selected from any known free radical type photoinitiator effective for promoting crosslinking reactions between mercapto (or thiol) groups and aliphatically unsaturated groups. Such crosslinking is commonly referred to as "thiol-ene" curing. Examples of component (C) include diethoxyacetophenone (DEAP), benzoin methyl ether, benzoin ethyl ether, benzoin isopropyl ether, diethoxyxanthone, chloro-thioxanthone, azo-bisisobutyronitrile, N-methyl diethanolaminebenzophenone 4,4'-bis(dimethylamino)benzophenone, diethoxyacetophenone, 2,2-dimethoxy-1,2-diphenylethan-1-one, 1-hydroxycyclohexyl-phenyl-ketone, 2-hydroxy-2-methyl-1-phenylpropan-1-one, 2-methyl-1-[4-(methylthio)phenyl]-2-morpholinopropan-1-one, 1-[4-(2-hydroxyethoxy)phenyl]-2-hydroxy-2-methyl-propan-1-one, 2-benzyl-2-dimethylamino-1-(4-morpholinophenyl)butan-1-one, bis(2,4,6-trimethylbenzoyl)phenylphosphine oxide, 2,4,6-trimethylbenzoyldi-phenylphosphinate, and combinations thereof. In specific embodiments, the (C) photoinitiator comprises, alternatively is, 2-hydroxy-2-methylpropiophenone.

The (C) photoinitiator is present in the composition in a catalytically effective amount for curing the composition, which can be readily determined by one of skill in the art. In some embodiments, the (C) photoinitiator is present in the composition in an amount of from 0.001 to 20, alternatively 0.01 to 10, alternatively 0.01 to 8, alternatively 0.01 to 5, alternatively 0.1 to 3, alternatively 0.5 to 1.5, or alternatively 0.9 to 1, wt. % based on the total weight of the composition.

The composition additionally comprises (D) an acryloxy-functional silane. The acryloxy-functional silane of component (D) is represented by the following formula:

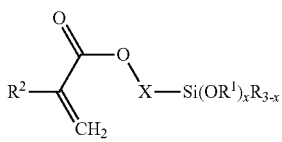

wherein X is a divalent hydrocarbon group, each R is independently a hydrocarbyl group, each $R^1$ is independently an alkyl group having from 1 to 8 carbon atoms, subscript x is 2 or 3, and $R^2$ is H or $R^1$.

In specific embodiments, X can be written as $-(CH_2)_t-$, where subscript t is from 1 to 10, alternatively from 1 to 9, alternatively from 1 to 8, alternatively from 1 to 7, alternatively from 2 to 6. Examples of the divalent hydrocarbon group X when subscript t is from 1 to 8 include alkylene groups with 1 to 8 carbon atoms, such as methylene groups, ethylene groups, propylene groups, butylene groups, pentylene groups, hexylene groups, heptylene groups, and octylene groups.

Hydrocarbyl groups suitable for R are described above for $R^4$. Each $R^1$ is independently an alkyl group having from 1 to 8, alternatively from 1 to 7, alternatively from 1 to 6, alternatively from 1 to 5, alternatively from 1 to 4, alternatively from 1 to 3, alternatively 1 or 2, alternatively 1, carbon atom(s). In addition, because each $R^1$ is independently, component (D) may include different silicon-bonded alkoxy groups, i.e., component (D) may include a trimethoxysilyl moiety, a trimethoxyethoxysilyl moiety, a methoxydiethoxysilyl moiety, a triethoxysilyl moiety, a methoxyethoxypropoxysilyl moiety, etc. In one embodiment, each $R^1$ is the same.

$R^2$ is H or $R^1$. When $R^2$ is H, component (D) includes acrylate functionality. When $R^2$ is methyl, component (D) includes methacrylate functionality.

Subscript x is 2 or 3. When subscript x is 2, component (D) has the following formula:

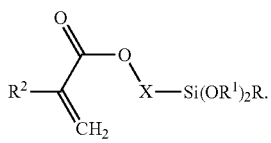

When subscript x is 3, component (D) has the following formula:

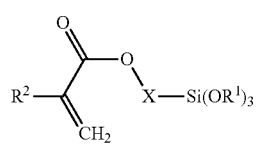

In specific embodiments, $R^2$ is methyl, X is propylene, subscript x is 3, and each $R^1$ is methyl such that component (D) comprises, alternatively consists essentially of, alternatively consists of 3-methacryloxypropyl trimethoxysilane. Other specific examples of component (D) include acryloxypropyl trimethoxysilane, acryloxypropyl dimethoxymethylsilane, methacryloxybutyl trimethoxysilane, methacryloxypropyl triethoxysilane, methacryloxypropyl diethoxyethylsilane, methacryloxypropyl dimethoxyethoxysilane, acryloxybutyl triethoxysilane, etc.

The (D) acryloxy-functional silane is present in the composition in an amount of from greater than 0 to 10, alternatively from 0.01 to 10, alternatively from 0.01 to 7, alternatively from 0.05 to 5, alternatively from 0.1 to 3, alternatively from 0.1 to 2, wt. % based on the total weight of the composition.

The composition further comprises (E) a tetraorthosilicate represented by the formula $Si(OR^3)_4$, wherein each $R^3$ is independently an alkyl group having from 1 to 10 carbon atoms.

Each $R^3$ is independently an alkyl group having from 1 to 10, alternatively from 1 to 9, alternatively from 1 to 8, alternatively from 1 to 7, alternatively from 1 to 6, alternatively from 1 to 5, alternatively from 1 to 4, alternatively from 1 to 3, alternatively 1 or 2, alternatively 1, carbon atom(s). In addition, because each $R^3$ is independently, component (E) may include different silicon-bonded alkoxy groups. In one embodiment, each $R^3$ is the same.

In specific embodiments, the tetraorthosilicate of component (E) comprises, alternatively is, tetraethyl orthosilicate (TEOS) and/or tetrapropyl orthosilicate (TPOS). Other examples of tetraorthosilicates suitable for component (E) include dimethoxydiethoxysilane, trimethoxyethoxysilane, tetramethoxysilane, tetrabutoxysilane, methoxydiethoxybutoxysilane, dipropoxydibutoxysilane, etc.

The (E) tetraorthosilicate is present in the composition in an amount of from 0.01 to 20, alternatively from 0.01 to 10, alternatively from 0.01 to 7.5, alternatively 0.5 to 5, alternatively from 0.1 to 3, alternatively from 0.5 to 2.5, wt. % based on the total weight of the composition.

The total molar ratio of mercapto groups of component (B) to silicon-bonded aliphatically unsaturated groups in components (A) and (D) will vary based on the selection of the (A) organopolysiloxane, (B) organopolysiloxane, and (D) acryloxy-functional silane in the composition. In certain embodiments, the total molar ratio of mercapto groups of component (B) to silicon-bonded aliphatically unsaturated groups in components (A) and (D) is from 10:1 to 1:10, alternatively from 0.1:1 to 5:1, alternatively from 0.1:1 to 3:1, alternatively from 0.3:1 to 2:1 (mercapto groups of (B) to silicon-bonded aliphatically unsaturated groups of (A) and (D)).

The composition may further contain (F) a filler. The (F) filler is not limited and may be, for example, a reinforcing filler, an extending filler, a thermally conductive filler, an electrically conductive filler, a flame retarding filler, a heat stabilizing filler, an acid accepting filler, a rheologically modifying filler, a phosphor, a coloring filler, a mineral filler, a glass filler, a carbon filler, or a combination thereof. The selection of the (F) filler is typically a function of the cured product to be formed with the composition and the end use applications of the cured product.

The (F) filler may be untreated, pretreated, or added in conjunction with an optional filler treating agent, described below, which when so added may treat the (F) filler in situ or prior to incorporation of the (F) filler in the composition. The (F) filler may be a single filler or a combination of two or more fillers that differ in at least one property such as type of filler, method of preparation, treatment or surface chemistry, filler composition, filler shape, filler surface area, average particle size, and/or particle size distribution.

The shape and dimensions of the (F) filler and/or the (I) pigment is also not specifically restricted. For example, the (F) filler may be spherical, rectangular, ovoid, irregular, and may be in the form of, for example, a powder, a flour, a fiber, a flake, a chip, a shaving, a strand, a scrim, a wafer, a wool, a straw, a particle, and combinations thereof. Dimensions and shape are typically selected based on the type of the (F) filler utilized, the selection of other components included within the composition, and the end use application of the cured product formed therewith.

Non-limiting examples of fillers that may function as reinforcing fillers include reinforcing silica fillers such as fume silica, silica aerogel, silica xerogel, and precipitated silica. Fumed silicas are known in the art and commercially available, e.g., fumed silica sold under the name CAB-O-SIL by Cabot Corporation of Massachusetts, U.S.A.

Non-limiting examples fillers that may function as extending or reinforcing fillers include quartz and/or crushed quartz, aluminum oxide, magnesium oxide, silica (e.g. fumed, ground, precipitated), hydrated magnesium silicate, magnesium carbonate, dolomite, silicone resin, wollastonite, soapstone, kaolinite, kaolin, mica muscovite, phlogopite, halloysite (hydrated alumina silicate), aluminum silicate, sodium aluminosilicate, glass (fiber, beads or particles, including recycled glass, e.g. from wind turbines or other sources), clay, magnetite, hematite, calcium carbonate such as precipitated, fumed, and/or ground calcium carbonate, calcium sulfate, barium sulfate, calcium metasilicate, zinc oxide, talc, diatomaceous earth, iron oxide, clays, mica, chalk, titanium dioxide (titania), zirconia, sand, carbon black, graphite, anthracite, coal, lignite, charcoal, activated carbon, non-functional silicone resin, alumina, silver, metal powders, magnesium oxide, magnesium hydroxide, magnesium oxysulfate fiber, aluminum trihydrate, aluminum oxyhydrate, coated fillers, carbon fibers (including recycled carbon fibers, e.g. from the aircraft and/or automotive industries), poly-aramids such as chopped KEVLAR™ or Twaron™, nylon fibers, mineral fillers or pigments (e.g. titanium dioxide, non-hydrated, partially hydrated, or hydrated fluorides, chlorides, bromides, iodides, chromates, carbonates, hydroxides, phosphates, hydrogen phosphates, nitrates, oxides, and sulfates of sodium, potassium, magnesium, calcium, and barium; zinc oxide, antimony pentoxide, antimony trioxide, beryllium oxide, chromium oxide, cerium oxide, lithopone, boric acid or a borate salt such as zinc borate, barium metaborate or aluminum borate, mixed metal oxides such as vermiculite, bentonite, pumice, perlite, fly ash, clay, and silica gel; rice hull ash, ceramic and, zeolites, metals such as aluminum flakes or powder, bronze powder, copper, gold, molybdenum, nickel, silver powder or flakes, stainless steel powder, tungsten, barium titanate, silica-carbon black composite, functionalized carbon nanotubes, cement, slate flour, pyrophyllite, sepiolite, zinc stannate, zinc sulphide), and combinations thereof. Alternatively, the extending or reinforcing filler may be selected from the group consisting of calcium carbonate, talc and a combination thereof.

As known in the art, certain fillers may serve as pigments. By way of example, white pigment can comprise include metal oxides such as titanium oxide, aluminum oxide, zinc oxide, zirconium oxide, magnesium oxide, and the like; hollow fillers such as glass balloons, glass beads, and the like; and additionally, barium sulfate, zinc sulfate, barium titanate, aluminum nitride, boron nitride, and antimony oxide. Such components can be considered fillers and/or pigments.

Extending fillers are known in the art and commercially available, such as a ground silica sold under the name MIN-U-SIL by U.S. Silica of Berkeley Springs, WV. Suitable precipitated calcium carbonates include Winnofil™ SPM from Solvay and Ultra-pflex™ and Ultra-pflex™ 100 from SMI.

When the (F) filler comprises a thermally conductive filler, the (F) filler may be both thermally conductive and electrically conductive. Alternatively, the (F) filler may be thermally conductive and electrically insulating. A thermally conductive filler may also have other beneficial properties, such as, but not limited to, a reinforcing filler, an extending filler, or another property as described above. The thermally conductive filler may be selected from, but not limited to, the group consisting of aluminum nitride, aluminum oxide, aluminum trihydrate, aluminum oxyhydrate, barium titanate, barium sulfate, beryllium oxide, carbon fibers, diamond, graphite, magnesium hydroxide, magnesium oxide, magnesium oxysulfate fiber, metal particulate, onyx, silicon carbide, tungsten carbide, zinc oxide, coated fillers, and a combination thereof.

When the (F) filler comprises the thermally conductive filler, the thermally conductive filler may comprise a metallic filler, an inorganic filler, a meltable filler, or a combination thereof. Metallic fillers include particles of metals, metal powders, and particles of metals having layers on the surfaces of the particles. These layers may be, for example, metal nitride layers or metal oxide layers. Suitable metallic fillers are exemplified by particles of metals selected from the group consisting of aluminum, copper, gold, nickel, silver, and combinations thereof, and alternatively aluminum. Suitable metallic fillers are further exemplified by particles of the metals listed above having layers on their surfaces selected from the group consisting of aluminum nitride, aluminum oxide, copper oxide, nickel oxide, silver oxide, and combinations thereof. For example, the metallic filler may comprise aluminum particles having aluminum oxide layers on their surfaces. Inorganic fillers are exemplified by onyx; aluminum trihydrate, aluminum oxyhydrate, metal oxides such as aluminum oxide, beryllium oxide, magnesium oxide, and zinc oxide; nitrides such as aluminum nitride; carbides such as silicon carbide and tungsten carbide; and combinations thereof. Alternatively, inorganic fillers are exemplified by aluminum oxide, zinc oxide, and combinations thereof. Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point from 50° C. to 250° C. The meltable filler may be a eutectic alloy, a non-eutectic alloy, or a pure metal. Many suitable meltable fillers are commercially available.

Alternatively or in addition, the (F) filler may comprise a non-reactive silicone resin. For example, the (F) filler may comprise a T resin, a TD resin, a TDM resin, a TDMQ resin, an MQ resin, or any other non-reactive silicone resin. Typically, such non-reactive silicone resins include at least 30 mole percent T siloxy and/or Q siloxy units. As known in the art, D siloxy units are represented by $R^0{}_2SiO_{2/2}$, and T siloxy units are represented by $R^0SiO_{3/2}$, where $R^0$ is an independently selected substituent.

The weight average molecular weight, $M_w$, of the non-reactive silicone resin will depend at least in part on the molecular weight of the silicone resin and the type(s) of substituents (e.g. hydrocarbyl groups) that are present in the non-reactive silicone resin. $M_w$ as used herein represents the weight average molecular weight measured using conventional gel permeation chromatography (GPC), with narrow molecular weight distribution polystyrene (PS) standard calibration, when the peak representing the neopentamer is excluded from the measurement. The PS equivalent $M_w$ of the non-reactive silicone resin may be from 12,000 to 30,000 g/mole, typically from 17,000 to 22,000 g/mole. The non-reactive silicone resin can be prepared by any suitable method. Silicone resins of this type have been prepared by cohydrolysis of the corresponding silanes or by silica hydrosol capping methods generally known in the art.

Phosphor is a type of filler that can convert the emission wavelength from a light source (optical semiconductor device) when the cured product of the composition is used as a wavelength conversion material. There is no particular limitation on this phosphor, and examples of the phosphor include yellow, red, green, and blue light phosphors, which include oxide phosphors, oxynitride phosphors, nitride phosphors, sulfide phosphors, oxysulfide phosphors, and the like, which are widely used in light emitting diodes (LED).

In certain embodiments, the (F) filler may comprise an acid acceptor. The acid acceptor may comprise a metal oxide such as magnesium oxide. Acid acceptors are generally known in the art and are commercially available under trade names including Rhenofit F, Star Mag CX-50, Star Mag CX-150, BLP-3, and MaxOx98LR. Rhenofit F was calcium oxide from Rhein Chemie Corporation of Chardon, Ohio, USA. Star Mag CX-50 was magnesium oxide from Merrand International Corp. of Portsmouth, N.H., USA. MagOX 98LR was magnesium oxide from Premier Chemicals LLC of W. Conshohocken, Pa., USA. BLP-3 was calcium carbonate was Omya Americas of Cincinnati, Ohio, USA.

Regardless of the selection of the (F) filler, the (F) filler may be untreated, pretreated, or added to form the composition in conjunction with an optional filler treating agent, which when so added may treat the (F) filler in situ in the composition.

The filler treating agent may comprise, for example, a silane such as an alkoxysilane, an alkoxy-functional oligosiloxane, a cyclic polyorganosiloxane, a hydroxyl-functional oligosiloxane such as a dimethyl siloxane or methyl phenyl siloxane, an alkene functionalized diol, an organosilicon compound, a stearate, or a fatty acid. The filler treating agent may comprise a single filler treating agent, or a combination of two or more filler treating agents selected from similar or different types of molecules.

The filler treating agent may comprise an alkoxysilane, which may be a mono-alkoxysilane, a di-alkoxysilane, a tri-alkoxysilane, or a tetra-alkoxysilane. Alkoxysilane filler treating agents are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof. In certain aspects the alkoxysilane(s) may be used in combination with silazanes, which catalyze the less reactive alkoxysilane reaction with surface hydroxyls. Such reactions are typically performed above 100° C. with high shear with the removal of volatile by-products such as ammonia, methanol and water.

Suitable filler treating agents also include alkoxysilyl functional alkylmethyl polysiloxanes, or similar materials where the hydrolyzable group may comprise, for example, silazane, acyloxy or oximo. In one embodiment, the filler treating agent is a silazane, which may be functionalized, e.g. with an alkenyl group. One such example is a silazane of formula $((CH_3)_2ViSi)_2NH$, where Vi indicates vinyl.

Alkoxy-functional oligosiloxanes can also be used as filler treating agents. Alkoxy-functional oligosiloxanes and methods for their preparation are generally known in the art.

Other filler treating agents include mono-endcapped alkoxy functional polydiorganosiloxanes, i.e., polyorganosiloxanes having alkoxy functionality at one end.

Alternatively, the filler treating agent can be any of the organosilicon compounds typically used to treat silica fillers. Examples of organosilicon compounds include organochlorosilanes such as methyltrichlorosilane, dimethyldichlorosilane, and trimethyl monochlorosilane; organosiloxanes such as hydroxy-endblocked dimethylsiloxane oligomer, silicon hydride functional siloxanes, hexamethyldisiloxane, and tetramethyldivinyldisiloxane; organosilazanes such as hexamethyldisilazane and hexamethylcyclotrisilazane; and organoalkoxysilanes such as alkylalkoxysilanes with Methyl, Propyl, n-Butyl, i-Butyl, n-Hexyl, n-Octyl, i-Octyl, n-Decyl, dodecyl, tetradecyl, hexadecyl, or octadecyl substituents. Organoreactive alkoxysilanes can include amino, methacryloxy, vinyl, glycidoxy, epoxycyclohexyl, isocyanurato, isocyanato, mercapto, sulfido, vinyl-benzyl-amino, benzyl-amino, or phenyl-amino substituents. Alternatively, the filler treating agent may comprise an organopolysiloxane. The use of such a filler treating agent to treat the surface of the (F) filler may take advantage of multiple hydrogen bonds, either clustered or dispersed or both, as the method to bond the organosiloxane to the surface of the (F) filler. The organosiloxane capable of hydrogen bonding has an average, per molecule, of at least one silicon-bonded group capable of hydrogen bonding. The group may be selected from: a monovalent organic group having multiple hydroxyl functionalities or a monovalent organic group having at least one amino functional group. Hydrogen bonding may be a primary mode of bonding of the organosiloxane to the (F) filler. The organosiloxane may be incapable of forming covalent bonds with the (F) filler. The organosiloxane capable of hydrogen bonding may be selected from the group consisting of a saccharide-siloxane polymer, an amino-functional organosiloxane, and a combination thereof. Alternatively, the polyorganosiloxane capable of hydrogen bonding may be a saccharide-siloxane polymer.

Alternatively, the filler treating agent may comprise alkylthiols such as octadecyl mercaptan and others, and fatty acids such as oleic acid, stearic acid, titanates, titanate coupling agents, zirconate coupling agents, and a combination thereof. One skilled in the art could optimize a filler treating agent to aid dispersion of the (F) filler without undue experimentation.

If utilized, the relative amount of the filler treatment agent and the (F) filler is selected based on the particular filler utilized as well as the filler treatment agent, and desired effect or properties thereof.

In some embodiments, the (F) filler is present in the composition in an amount of from 1 to 70, alternatively from 5 to 60, alternatively from 10 to 50, alternatively from 10 to 35, alternatively from 20 to 30, alternatively from 25 to 27, wt. % based on the total weight of the composition.

In certain embodiments, the composition further comprises (G) a condensation catalyst. Generally speaking, condensation catalysts are not required for use of adhesion promoters including hydrolysable and/or condensable groups, which can hydrolyse with ambient moisture, e.g. relative humidity, and condense with hydroxyl groups present on certain substrates. However, without intending to be limited by theory, it is believed that incorporation of (G) the condensation catalyst renders the composition dual curable such that the composition can cure via both condensation and exposure to irradiation. For example, the mercapto groups of component (B) may bind to the acryloxy-functional groups of component (D), and thus both condensation curing and thiol-ene curing may take place simultaneously. Dual curing is particularly advantageous in certain end uses of the composition, as condensation curing may promote better curing in regions difficult to irradiate, e.g. if there are shadows due to surface characteristics on a substrate on which the composition is cured.

The condensation catalyst (G), if utilized, is not limited and, in some embodiments, is exemplified by tin catalysts, titanium catalysts, zirconate catalysts, and zirconium catalysts. General examples of suitable tin catalysts include organotin compounds where the valence of the tin is either +4 or +2 (e.g. tin (IV) compounds and/or tin (II) compounds). Specific examples of tin (IV) compounds include stannic salts of carboxylic acids such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin trisuberate, dibutyl tin dioctanoate, dibutyl tin diformate, isobutyl tin triceroate, dimethyl tin dibutyrate, dimethyl tin di-neodeconoate, dibutyl tin di-neodeconoate, triethyl tin tartrate, dibutyl tin dibenzoate, butyltintri-2-ethylhexanoate, dioctyl tin diacetate, tin octylate, tin oleate, tin butyrate, tin naphthenate, dimethyl tin dichloride, a combination thereof, and/or a partial hydrolysis product thereof. Specific examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthanate, stannous hexanoate, stannous succinate, stannous caprylate, and a combination thereof. Examples of suitable titanium catalysts include titanium esters such as tetra-n-butyltitanate tetraisopropyltitanate, tetra-2-ethylhexyltitanate, tetraphenyltitanate, triethanolamine titanate, organosiloxytitanium compounds, and dicarbonyl titanium compounds, such as titanium ethyl acetoacetate, diisopropoxydi(ethoxyacetoacetyl) titanium and bis(acetoacetonyl)-diisopropoxy titanium (IV). In specific embodiments, the (G) condensation catalyst is titanium ethyl acetoacetate complex mixed with a methyl-trimethoxy silane.

In certain embodiments, the (G) condensation catalyst is utilized. In specific embodiments, the (G) condensation catalyst is present in the composition in an amount of from 0.001 to 5, alternatively from 0.01 to 3, alternatively from 0.01 to 1, alternatively from 0.01 to 0.5, alternatively from 0.01 to 0.2, wt. %. based on the total weight of the composition.

In certain embodiments, the composition is solventless, i.e., the composition is free from organic solvents. Examples of the organic solvent include those comprising an alcohol, such as methanol, ethanol, isopropanol, butanol, and n-propanol; a ketone, such as acetone, methylethyl ketone, and methyl isobutyl ketone; an aromatic hydrocarbon, such as benzene, toluene, and xylene; an aliphatic hydrocarbon, such as heptane, hexane, and octane; a glycol ether, such as propylene glycol methyl ether, dipropylene glycol methyl ether, propylene glycol n-butyl ether, propylene glycol n-propyl ether, and ethylene glycol n-butyl ether; a halogenated hydrocarbon, such as dichloromethane, 1,1,1-trichloroethane and methylene chloride; chloroform; dimethyl sulfoxide; dimethyl formamide, acetonitrile; tetrahydrofuran; white spirits; mineral spirits; naphtha; n-methylpyrrolidone; and the like, as well as derivatives, modifications, and combination thereof.

In some embodiments, the composition further comprises one or more additives. Examples of suitable additives that may be present in the composition include fillers, treating agents (e.g. filler treating agents), cross-linkers, adhesion promotors, surface modifiers, drying agents, extenders, biocides, flame retardants, plasticizers, end-blockers, binders, anti-aging additives, water release agents, pigments, dyes, rheology modifiers, carriers, tackifying agents, corrosion inhibitors, catalyst inhibitors, viscosity modifiers, UV absorbers, anti-oxidants, light-stabilizers, and the like, as well as combinations thereof. In specific embodiments, the composition is free from organopolysiloxanes, siloxanes, and silanes other than components (A)-(E).

As introduced above, a method of forming a cured product ("the method") is disclosed. The method comprises the step of applying the composition to a surface of a substrate. The method further comprises the step of irradiating the composition on the substrate to give a cured product. When the composition includes the (G) condensation catalyst, the method may further comprise moisture curing the composition. However, moisture curing typically initiates upon exposure to atmospheric moisture and no active step is required to initiate moisture curing.

The composition may be applied (i.e., disposed or dispensed) on the substrate in any suitable manner. Typically, the composition is applied in wet form via a wet coating technique. The composition may be applied by i) spin coating; ii) brush coating; iii) drop coating; iv) spray coating; v) dip coating; vi) roll coating; vii) flow coating; viii) slot coating; ix) gravure coating; x) Meyer bar coating; or xi) a combination of any two or more of i) to x). Typically, disposing the composition on the substrate results in a wet deposit or uncured layer on the substrate, which is subsequently cured to give the cured product on the substrate.

The substrate is not limited and may be any substrate. The cured product may be physically and/or chemically bonded to the substrate depending on its selection. The substrate may optionally have a continuous or non-continuous shape, size, dimension, surface roughness, and other characteristics.

The substrate can be an electronic article or component. In other embodiments, the substrate can comprise glass. Alternatively still, the substrate may comprise a plastic, which may be a thermosetting and/or thermoplastic. However, the substrate may alternatively be or comprise metal, ceramics, fiberglass, cellulose (e.g. paper), wood, cardboard, paperboard, a silicone, or polymeric materials, or a combination thereof.

Specific examples of suitable substrates include paper substrates such as Kraft paper, polyethylene coated Kraft paper (PEK coated paper), thermal paper, and regular papers; polymeric substrates such polyamides (PA); polyesters such as polyethylene terephthalates (PET), polybutylene terephthalates (PBT), polytrimethylene terephthalates (PTT), polyethylene naphthalates (PEN), and liquid crystalline polyesters; polyolefins such as polyethylenes (PE), polypropylenes (PP), and polybutylenes; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones; polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers, and combinations thereof.

The wet deposit or uncured layer is cured via exposure to irradiation, typically UV radiation. Useful UV radiation sources include conventional mercury-vapor lamps designed to emit ultraviolet energy in various ultraviolet wavelength bands, LED curing lamps, etc. For example, useful radiation wavelength ranges include 200 to 400 nm. UV cure is generally effected in the range of 40 milliwatts/cm$^2$ ("mW/cm$^2$") to 30,000 mW/cm$^2$, such as in the range of about 70 mW/cm$^2$ to about 600 mW/cm$^2$. In certain embodiments, irradiation is carried out in an inert atmosphere, e.g. under nitrogen. In specific embodiments, UV cure is generally effected at an intensity of 300 mW/cm$^2$ and 4 J/cm$^2$ dosage of UVA and UVB.

If desired, the cured product formed via irradiating the uncured layer can be patterned. For example, in these embodiments, a photomask is typically utilized in the selective curing of a target portion of the uncured layer. Photomasks generally have a defined pattern for transmitting UV radiation and a complementary pattern for blocking transmission of UV radiation. For example, the photomask includes portions that allow for transmission of UV radiation, and portions that block transmission of UV radiation, such that the defined pattern can be transferred or copied via selectively curing. The portions of the photomask that allow for transmission of UV radiation are aligned with the target portion of the uncured layer, and the complementary portions of the photomask that block transmission of UV radiation are aligned with non-target portions of the uncured layer. Such a method may be referred to as photolithography. The target portions of the uncured layer are cured to give cured regions, and the non-target portions of the uncured layer are not cured to give uncured regions.

The uncured regions of the cured product that remain through use of a photomask may be etched via a wet method, e.g. with an organic solvent or aqueous base, alternatively via a dry method (e.g. with plasma or reactive ions). Typically, the uncured regions are etched or removed with a solvent, such as butyl acetate, alcohols, ketones, aromatic hydrocarbons, alkanes, ethers, esters, and combinations thereof. Etching or removing the uncured regions results in only the cured regions, which may have 100% pattern retentivity.

When the composition comprises the (G) condensation catalyst and the method further comprises moisture curing the composition (and/or the cured product formed from irradiation), moisture curing may be effected without any proactive steps. The composition (and/or the cured product formed from irradiation) can be moisture cured prior to, during, or after curing via irradiation. In one embodiment, moisture curing is effective after curing via irradiation by removing the inert atmosphere and exposing the cured product formed from irradiation to moisture, e.g. relative humidity. Sequential curing steps are typically utilized when irradiation is carried out in an inert atmosphere, which often does not include ambient moisture to effect moisture curing.

In certain embodiments, the cured product can be exposed to a post-bake, e.g. exposed to elevated temperature for a period of time. The elevated temperature is typically from 80 to 140, alternatively from 100 to 120, ° C.

As introduced above, a cured product disposed on a substrate is also disclosed. The substrate is not limited and may be any substrate. The cured product may be physically and/or chemically bonded to the substrate depending on its selection. The substrate may optionally have a continuous or non-continuous shape, size, dimension, surface roughness, and other characteristics.

The following examples are intended to illustrate the invention and are not to be viewed in any way as limiting to the scope of the invention.

Certain components utilized in the Examples are set forth in Table 1 below.

TABLE 1

| Components/Compounds Utilized | |
|---|---|
| Abbreviation | Meaning/Definition |
| Organopolysiloxane (A-1) | Vinyl-functional dimethylpolysiloxane of average formula: $(CH_3)_2ViSiO-[(CH_3)_2SiO]_{766}-Si(CH_3)_2Vi$, where Vi indicates vinyl |
| Organopolysiloxane (A-2) | Vinyl-functional dimethylpolysiloxane of average formula: $(CH_3)_2ViSiO-[(CH_3)_2SiO]_{158}-SiVi(CH_3)_2$, where Vi indicates vinyl |
| Organopolysiloxane (B-1) | Trimethylsiloxy-endblocked dimethylsiloxane methyl(3-mercaptopropyl)siloxane copolymer having the following chemical structure: $((CH_3)_3SiO_{1/2})_2(CH_3R'SiO_{2/2})_5((CH_3)_2SiO_{2/2})_{43}$ where R' = $HS(CH_2)_2CH_2$— |
| Photoinitiator (C-1) | 2-hydroxy-2-methylpropiophenone |
| Silane (D-1) | 3-Methacryloxypropyltrimethoxysilane |
| Silane (D-2) | 3-Glycidyloxypropyltrimethoxysilane |
| Silane (D-3) | 3-mercaptopropyltrimethoxysilane |
| Tetraorthosilicate (E-1) | Tetraethyl orthosilicate (TEOS) |
| Tetraorthosilicate (E-2) | Tetrapropyl orthosilicate (TPOS) |
| Fumed Silica Filler (F-1) | Hexamethyldisilazane treated fumed silica having an average particle size of 0.2 to 0.3 microns |
| Condensation Catalyst (G-1) | Titanium ethyl acetoacetate complex mixed with methyltrimethoxy silane |

General Procedure 1: Compositions of Examples 1-7 and Comparative Examples 1-5

Compositions were prepared in Examples 1-7 and Comparative Examples 1-5 in accordance with General Procedure 1. In General Procedure 1, a preliminary organopolysiloxane mixture was formed in a 100 mL dental cup by disposing the Organopolysiloxane (A-1), the Organopolysiloxane (A-2), the Organopolysiloxane (B-1), and the Fumed Silica Filler (F-1) therein (in the amounts specified below). The preliminary organopolysiloxane mixture was then blended at 1,000 revolutions per minute (rpm) for 20 seconds, and then blended at 2,000 rpm for 45 seconds. Then, the Photoinitiator (C-1) and the particular Silanes (0) and Tetraorthosilicates (E) utilized (as identified in Table 2 below) were added to each preliminary organopolysiloxane mixture to give a blend. Each blend was then mixed at 2,000 rpm for 30 seconds. When utilized (i.e., in Examples 2-7 and Comparative Example 5), the Condensation Catalyst (G-1) was added to the blend to give a composition, which was then mixed at 2,000 rpm for 30 seconds. Each blend or composition was packaged into three 30 mL syringes, de-aired, and packaged into Al bags. Table 2 below shows the particular Silanes (0) and Tetraorthosilicates (E) utilized in the compositions of Examples 1-7 and Comparative Examples 1-5. Tables 3 and 4 show the amounts of each component utilized in each of the compositions of Examples 1-7 and Comparative Examples 1-5.

TABLE 2

Silanes and Tetraorthosilicates Utilized

| Example | Silanes and Tetraorthosilicates |
| --- | --- |
| Example 1 | (D-1) & (E-1) |
| Example 2 | (D-1) & (E-1) |
| Example 3 | (D-1) & (E-1) |
| Example 4 | (D-1) & (E-1) |
| Example 5 | (D-1) & (E-1) |
| Example 6 | (D-1) & (E-1) |
| Example 7 | (D-1) & (E-2) |
| Comparative Example 1 | (D-1) |
| Comparative Example 2 | (E-1) |
| Comparative Example 3 | (D-3) & (E-1) |
| Comparative Example 4 | (D-2) & (E-1) |
| Comparative Example 5 | (E-1) |

TABLE 3

Compositions of Examples 1-7

| Components | Example 1 | Example 2 | Example 3 | Example 4 | Example 5 | Example 6 | Example 7 |
| --- | --- | --- | --- | --- | --- | --- | --- |
| (A-1) g | 29.76 | 29.76 | 29.76 | 29.76 | 29.76 | 29.76 | 29.76 |
| (A-2) g | 31.81 | 31.81 | 31.81 | 31.81 | 31.81 | 31.81 | 31.81 |
| (B-1) g | 7.19 | 7.19 | 11.33 | 8.85 | 8.85 | 8.85 | 8.85 |
| (C-1) g | 0.94 | 0.94 | 0.94 | 0.94 | 0.94 | 0.94 | 0.94 |
| (D-1) g | 0.5 | 0.5 | 1.36 | 0.75 | 0.75 | 0.75 | 0.75 |
| (E-1) g | 1.4 | 1.4 | 1.41 | 1.41 | 0.7 | 2.2 | — |
| (E-2) g | — | — | — | — | — | — | 1.4 |
| (F-1) g | 26.39 | 26.39 | 26.39 | 26.39 | 26.39 | 26.39 | 26.39 |
| (G-1) g | — | 0.1 | 0.1 | 0.1 | 0.1 | 0.1 | 0.1 |

TABLE 4

Comparative Examples 1-5

| Components | Comparative Example 1 | Comparative Example 2 | Comparative Example 3 | Comparative Example 4 | Comparative Example 5 |
| --- | --- | --- | --- | --- | --- |
| (A-1) g | 29.76 | 29.76 | 29.76 | 29.76 | 29.76 |
| (A-2) g | 31.81 | 31.81 | 31.81 | 31.81 | 31.81 |
| (B-1) g | 7.19 | 5.81 | 5.81 | 5.81 | 5.81 |
| (C-1) g | 0.94 | 0.94 | 0.94 | 0.94 | 0.94 |
| (D-1) g | 0.5 | — | — | — | — |
| (D-2) g | — | — | — | 0.5 | — |
| (D-3) g | — | — | 0.5 | — | — |
| (E-1) g | — | 1.4 | 1.4 | 1.4 | 1.41 |
| (F-1) g | 26.39 | 26.39 | 26.39 | 26.39 | 26.39 |
| (G-1) g | — | — | — | — | 0.1 |

Each of the compositions of Examples 1-7 an Comparative Examples 1-5 were utilized to prepare a cured product on a substrate. The adhesive properties of each cured product was then analyzed. The method to prepare cured products and related testing method for adhesive properties is described below.

Adhesion Test Procedure

A 2024 T3 Alclad aluminum substrate (7.5 cm×2.5 cm×1 mm) was cleaned using acetone and isopropanol and dried with air. A 1 cm wide polytetrafluoroethylene (PTFE) tape was placed on the bottom of the substrate. The compositions of Examples 1-7 and Comparative Examples 1-5 were then each cast onto the substrate to give a wet deposit having a 2.5±0.2 mm thickness and a 5±1 mm width. Each wet deposit was cured by exposing each wet deposit to irradiation (via Colight UV equipment with a mercury lamp at an intensity of 300 mW/cm$^2$ and a dosage of 4 J/cm$^2$ of UVA and UVB) and then kept at room temperature (22° C.) with 35-42% Relative Humidity (RH). Each wet deposit was further cured for 48 hours at room temperature after exposure to irradiation to give a cured product disposed on the substrate.

The adhesion of each cured product was then tested by peeling off the cured product from the PTFE tape covered side of the substrate. If the cured product peeled off from the substrate without leaving any residue, the cured product was noted to have adhesive failure (AF). If the cured product stuck on the substrate while peeling off and breaking, thus leaving residue on the substrate, then the sample was noted to have cohesive failure (CF). Surprisingly, all of the cured products formed from the compositions of Examples 1-7 demonstrated cohesive failure, whereas all of the cured products formed from the compositions of Comparative Examples 1-5 demonstrated adhesive failure. For cured products having desirable adhesiveness to a substrate, cohesive failure is desired instead of adhesive failure. As such, the compositions of Examples 1-7 were demonstrated as forming cured products having excellent adhesiveness to the substrate, particularly as compared to the cured products formed from the compositions of Comparative Examples 1-5.

It is to be understood that the appended claims are not limited to express and particular compounds, compositions, or methods described in the detailed description, which may vary between particular embodiments which fall within the scope of the appended claims.

What is claimed is:

1. A curable composition, comprising:
   (A) an organopolysiloxane having an average of at least two silicon-bonded aliphatically unsaturated groups per molecule; wherein the (A) organopolysiloxane comprises:
      (A1) a first linear organopolysiloxane having a degree of polymerization of from 550 to 2000; and
      (A2) a second organopolysiloxane having a degree of polymerization of from 50 to 500;
   (B) an organopolysiloxane free from aliphatically unsaturated groups and having an average of at least two mercapto groups per molecule;
   (C) a photoinitiator;
   (D) an acryloxy-functional silane represented by the following formula:

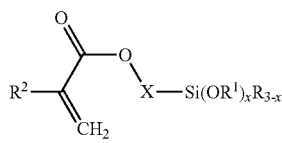

wherein X is a divalent hydrocarbon group, each R is independently a hydrocarbyl group, each R$^1$ is independently an alkyl group having from 1 to 8 carbon atoms, subscript x is 2 or 3, and R$^2$ is H or R$^1$; and
   (E) a tetraorthosilicate of the formula: Si(OR$^3$)$_4$, wherein each R$^3$ is independently an alkyl group having from 1 to 10 carbon atoms.

2. The composition of claim 1, wherein the composition further comprises: (F) a filler; or (G) a condensation catalyst; or both.

3. The composition of claim 1, wherein:
   the (A) organopolysiloxane is present in an amount of from 5 to 95 wt. %;
   the (C) photoinitiator is present in an amount of from 0.01 to 10 wt. %;
   the (D) acryloxy-functional silane is present in an amount of from 0.05 to 5 wt. %; and
   the (E) tetraorthosilicate is present in an amount of from 0.05 to 5 wt. %;
   each based on the total weight of the composition.

4. The composition of claim 1, wherein the total molar ratio of mercapto groups of component (B) to silicon-bonded aliphatically unsaturated groups in components (A) and (D) is from 0.1:1 to 3:1.

5. The composition of claim 1, wherein the (A) organopolysiloxane is represented by the following average formula:

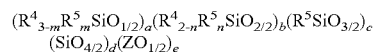

wherein each R$^4$ is an independently selected substituted or unsubstituted hydrocarbyl group free from aliphatic unsaturation; each R$^5$ is independently R$^4$ or an aliphatically unsaturated group having from 1 to 10 carbon atoms; each subscript m is independently an integer from 0 to 3 in each unit indicated by subscript a; each subscript n is an integer from 0 to 2 in each unit indicated by subscript b; with the proviso that at least two of R$^5$ are aliphatically unsaturated groups; each Z is independently H or an alkyl group; and wherein a, b, c, d, and e are mole fractions satisfying the following: a>0; b>0; c≥0; d≥0; 0≤e≤0.05; and a+b+c+d+e=1.

6. The composition of claim 5, wherein c>0 and/or d>0 such that the (A) organopolysiloxane is branched or resinous.

7. The composition of claim 1, wherein the (A) organopolysiloxane is represented by the following average formula:

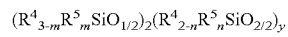

wherein y is an integer from 10 to 10,000; each R$^4$ is an independently selected substituted or unsubstituted hydrocarbyl group free from aliphatic unsaturation; each R$^5$ is independently R$^4$ or an aliphatically unsaturated group having from 1 to 10 carbon atoms; each subscript m is independently an integer from 0 to 3; each subscript n is an integer from 0 to 2 in each unit indicated by subscript y; with the proviso that at least two of R$^5$ are aliphatically unsaturated groups.

8. The composition of claim 7, wherein each subscript m is 1 and each subscript n is 0 such that the (A) organopolysiloxane is represented by the following average formula:

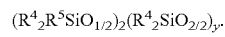

9. The composition of claim 1, wherein the (B) organopolysiloxane is represented by the following average formula:

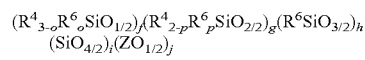

wherein each R$^4$ is an independently selected substituted or unsubstituted hydrocarbyl group free from aliphatic unsaturation; each R$^6$ is independently R$^4$ or comprises a mercapto group; each subscript o is independently an integer from 0 to 3 in each unit indicated by subscript f; each p is independently an integer from 0 to 2 in each unit indicated by subscript g; with the proviso that at least two of R$^6$ independently comprise mercapto groups; each Z is independently H or an alkyl group; wherein f, g, h, i, and j are mole fractions satisfying the following: f>0; g>0; h≥0; i≥0; 0≤j≤0.05 and f+g+h+i+j=1.

10. The composition of claim 9, wherein h>0 and/or i>0 such that the (B) organopolysiloxane is branched or resinous.

11. The composition of claim 1, wherein the (B) organopolysiloxane is represented by the following average formula:

$$(R^4{}_{3-o}R^6{}_o SiO_{1/2})_2 (R^4{}_{2-p}R^6{}_p SiO_{2/2})_z$$

wherein z is an integer from 10 to 10,000; each $R^4$ is an independently selected substituted or unsubstituted hydrocarbyl group free from aliphatic unsaturation; each $R^6$ is independently $R^4$ or comprises a mercapto group; each subscript o is independently an integer from 0 to 3; each p is independently an integer from 0 to 2 in each unit indicated by subscript z; with the proviso that at least two of $R^6$ independently comprise mercapto groups.

12. The composition of claim 11, wherein subscript o is 0 and the (B) organopolysiloxane is represented by the following average formula:

$$(R^4{}_3 SiO_{1/2})_2 (R^4 R^6 SiO_{2/2})_{z'} (R^4{}_2 SiO_{2/2})_{z''}$$

wherein z' is an integer from 2 to 100, subscript z" is an integer of from 8 to 9998, with the proviso that 10≤z'+z"≤10,000.

13. The composition of claim 1, wherein: (i) the (E) tetraorthosilicate comprises tetraethyl orthosilicate (TEOS) and/or tetrapropyl orthosilicate (TPOS); or (ii) the (D) acryloxy-functional silane comprises 3-methacryloxypropyl trimethoxysilane; or (iii) both (i) and (ii).

14. A method of forming a cured product, the method comprising:
applying the composition of claim 1 to a surface of a substrate; and
irradiating the composition on the substrate to give the cured product.

15. A cured product disposed on a substrate formed in accordance with the method of claim 14.

* * * * *